(12) United States Patent
Fioratti

(10) Patent No.: US 7,678,310 B2
(45) Date of Patent: Mar. 16, 2010

(54) BLOCK TOOL FOR SURFACE FINISHING OPERATIONS AND METHOD OF OBTAINING THE SAME

(75) Inventor: Stefano Fioratti, Desenzano (IT)

(73) Assignee: Aros S.R.L., Veona (IT)

( * ) Notice: Subject to any disclaimer, the term of this patent is extended or adjusted under 35 U.S.C. 154(b) by 608 days.

(21) Appl. No.: 11/436,031

(22) Filed: May 18, 2006

(65) Prior Publication Data

US 2006/0264163 A1 Nov. 23, 2006

(30) Foreign Application Priority Data

May 18, 2005 (IT) .......................... VR2005A0062

(51) Int. Cl.
*D04H 1/52* (2006.01)
(52) U.S. Cl. .......................... 264/128; 425/89; 425/110
(58) Field of Classification Search ................. 264/128; 425/89, 110
See application file for complete search history.

(56) References Cited

U.S. PATENT DOCUMENTS 5,681,362 A    10/1997    Wiand 7,226,555 B2 *  6/2007  Weihrauch ................... 264/163
2002/0019199 A1  2/2002  Goers et al.

FOREIGN PATENT DOCUMENTS

| DE | 1 051 683 | 2/1959 |
| DE | 102 21 869 A1 | 11/2003 |
| GB | 2 304 071 A | 3/1997 |
| JP | 2001-25957 A | 1/2001 |
| WO | WO-2005/115716 A1 | 12/2005 |

OTHER PUBLICATIONS

Weihrauch, Georg, "Method for the production of a bristle structure on a carrier" WO 03/097324.*

* cited by examiner

*Primary Examiner*—Christina Johnson
*Assistant Examiner*—Galen Hauth
(74) *Attorney, Agent, or Firm*—Orum & Roth LLC

(57) ABSTRACT

A block tool for surface finishing operations, which has a support and coupling member (2) for connection to a machine tool, and an abrasive block (3) held by the support member (2), the abrasive block being obtained from a solution or emulsion of a granular abrasive material dispersed in a matrix comprising a thermoplastic resin.

6 Claims, 2 Drawing Sheets

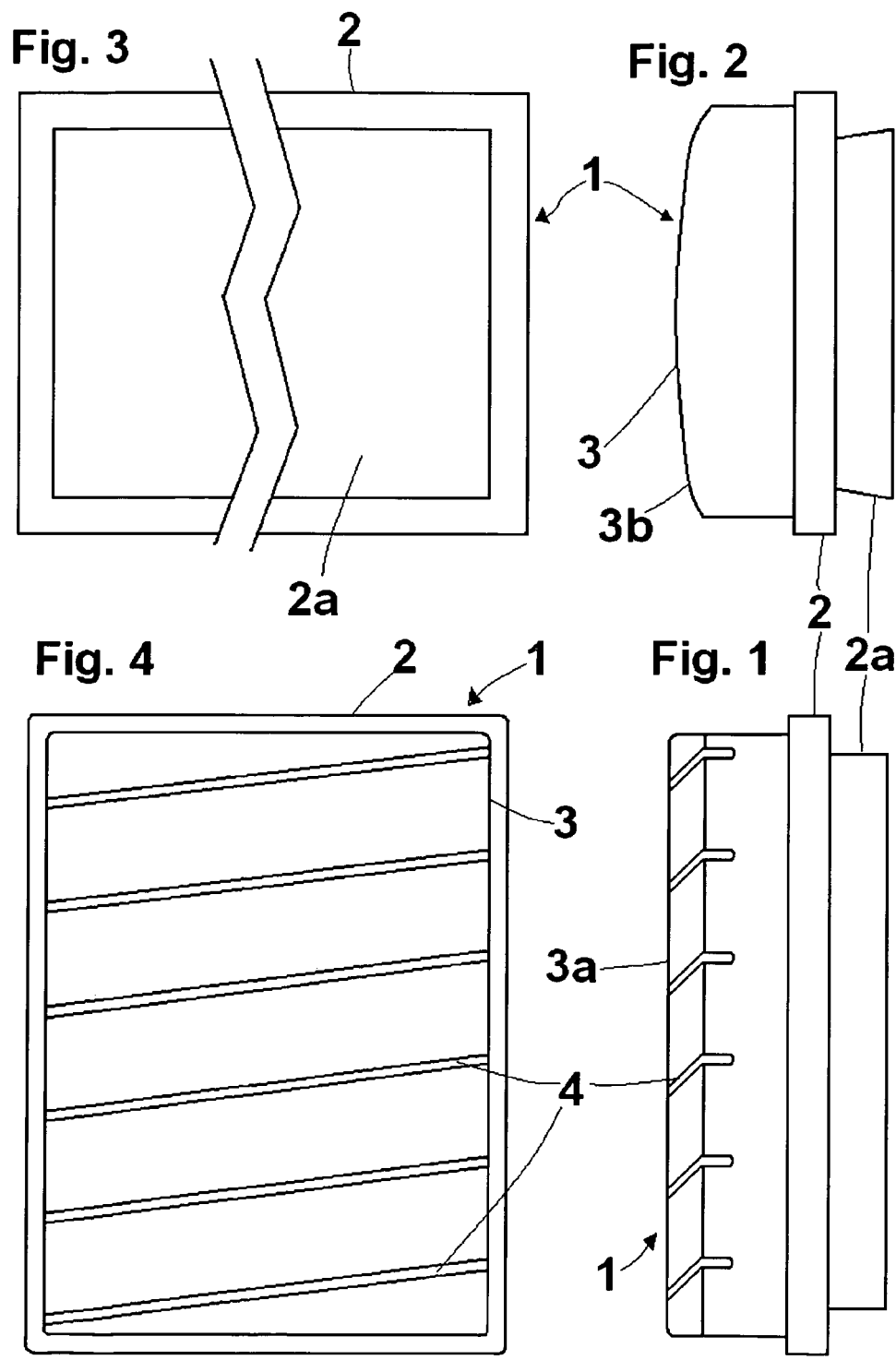

BLOCK TOOL FOR SURFACE FINISHING OPERATIONS AND METHOD OF OBTAINING THE SAME

FIELD OF INVENTION

The present invention relates to a block-shaped tool for finishing operations, e.g. smoothing or polishing of workable surfaces, particularly surfaces of stony materials, glazed gres, resin-quartz, resin-granite, resin-marble, resin-cement, cement-quartz, cement-granite, cement-marble agglomerates and the like, as well as a method of obtaining the same.

The present invention also relates to a method of manufacturing a block of abrasive material to obtain a block tool according to the present invention.

BACKGROUND OF INVENTION

As it is known, block tools have already been proposed, usually including thermosetting resins or sintered metal powders and designed to be mounted on suitable heads or assemblies of a machine tool for carrying out finishing operations by abrasion, e.g. smoothing or polishing surfaces of stony materials (natural stones, such as marbles, granites, etc.), agglomerates, such as glazed gres, resin-quartz, resin-granite, resin-marble, resin-cement, cement-quartz, cement-granite, cement-marble agglomerates, and to be subjected, in use, to a rotating or oscillating movements, or also rotating and oscillating movements.

The block tools used at present for finishing operations of the above mentioned type have, however, various drawbacks, e.g. brittleness, relatively high tendency to undergo abrasion, as well as high costs.

Conventional block tools are obtained according to various manufacturing methods. According to a first method use is made of a press with mold/s and counter-mold/s that have to be heated to a temperature greater than that at which a specific thermosetting resin can be molded. Moreover, it is difficult to obtain uniform heat propagation towards the tool core, which results in inner and outer portions of the block being kept for different "holding" times at the ideal molding temperature, and thus the resulting tool could have portions with different mechanical characteristic features. Moreover, with a heated mold and counter-mold method, it is highly risky to mold a block tool provided with a separate coupling member for attachment to the machine as such a member would prevent, or otherwise hinder, heat propagation within the mold and counter-mold assembly.

A second method comprises casting semi-liquid or pasty inert fillers and thermosetting resins. However, such a method faces problems in relation to sedimentation and separation of the various components as liquids and resins have different specific weights, and obviously heavier components settle, which results in a great unevenness in the composition of the block tool. Moreover, when using such a method an exothermic chemical reaction between polyester or epoxidic resins and the used catalysts (e.g. peroxides, amines) can be produced, which is, inter alia, difficulty to control as it is highly dependant upon ambient temperature that often causes cracks or deformations in the block tool. Finally, with this method the resin percentage must be sufficient to guarantee that a sufficiently fluid mixture is obtained to make it possible to carry out casting without defects, and this requirement is a limitation to the mechanical characteristics of the tools thus obtained.

Moreover, the thermosetting resins that can be used usually need a post-polymerisation heat treatment (postcuring), usually from about 100° to 150° C., thereby increasing the distortion temperature TG, and consequently the mechanical characteristics, up to acceptable values. Preferably, after post-curing treatment, the distortion temperature is lowered to about 60°-120° C.

Another method of producing block tools comprises the use of granular abrasive material (typically industrial diamonds) bonded together by a "metal sintered" binder. In such a method metal powders are used having granular size of the order of some microns, which are mixed in various proportions, and then loaded into a press or sintering machine, and finally subjected to a sintering process.

Particles having size of the order of microns risk to become oxidized by air, which would be detrimental to the efficiency of the sintering operation. Accordingly, such a method of producing block tools requires permanent monitoring and correct powders preservation (usually in a container provided with dehumidifying resin cartridges or under vacuum). This method thus involves high costs for being carried out and for raw materials, as well as problems of metal pollution in waste working water, besides any problems connected to heat shock of the industrial diamond during sinterization with the serious risk of obtaining a permanently weakened structure.

SUMMARY OF THE INVENTION

A main object of the present invention is to provide a block-shaped tool for finishing operations of workable surfaces, which is provided with high impact strength and high removal effectiveness to carry out plane and even smoothing and polishing operations.

Another object of the present invention is to provide a block tool for surface finishing operations that can be carried out at competitive costs with respect to conventional block tools, the removal effectiveness being equal.

According to a first aspect of the present invention, there is provided a block tool for surface finishing operations, which has at least one support and coupling member for connection to a machine tool, and at least one abrasive block held by said support member, and wherein said at least one abrasive block is obtained from at least one solution or emulsion of at least one granular abrasive material dispersed in a matrix comprising at least one thermoplastic resin.

According to another aspect of the present invention, there is provided a method of producing a block tool comprising the following steps in sequence:

arranging at least one support member in a mold;

loading the mold with a solution or emulsion of at least one granular abrasive material dispersed in a matrix comprising at least one thermoplastic resin;

letting said at least one thermoplastic resin to set, thereby obtaining at least one solid and compact block; and removing the block tool or tools from the mold.

Advantageously, the solution or emulsion is injection loaded into the mold.

According to another aspect of the present invention, there is provided a method of producing an abrasive block comprising the following steps:

loading at least one cavity in a mold with a resin matrix comprising at least one thermoplastic resin and at least one granular abrasive material;

letting said resin matrix to sit, thereby obtaining at least one abrasive solid block; and removing each solid block from the mold.

BRIEF DESCRIPTION OF THE DRAWINGS

Further features and advantages of the present invention will better appear from the following detailed description of some presently preferred embodiments thereof, given by way of non limiting examples with reference to the accompanying drawings, in which:

FIGS. 1 to 4 are front, side elevation views and views from the top of FIG. 2 and from the bottom of FIG. 1, respectively, of a block tool according to the present invention;

DESCRIPTION OF THE PREFERRED EMBODIMENTS

Figure 5:
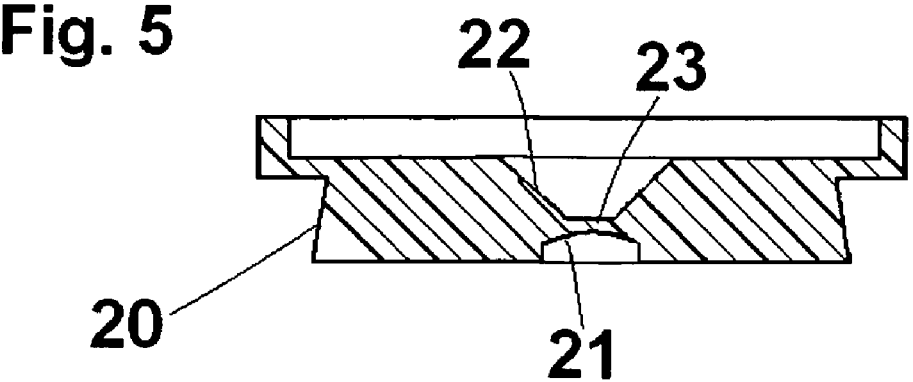
FIG. 5 is a cross-sectional view of a support member for a block tool according to the present invention.

In the accompanying drawings the same or similar parts or components are indicated with the same reference numerals.

With reference first to FIGS. 1 to 4, there is illustrated a tool, generally designed with the reference numeral 1, which has a support member 2 provided with an undercut head 2a arranged to be coupled and secured to a working unit of a polishing or smoothing machine, having a respective dovetail receiving seat, as it is well known in the art. To a side opposite to the undercut head 2a of the support member 2 a real abrasive block 3 is anchored, that is substantially parallelepiped in shape and obtained from a solution or emulsion of one or more granular abrasive materials in a matrix comprising one or more thermoplastic resins, as it will be further described below.

Advantageously, the matrix comprises at least one filling material, which is preferably selected from the group comprising glass fibers or balls, talc, silica, quartz, stainless steel, cooper, bronze powders, carbonates, iron, zirconium, tin, aluminium, magnesium oxides. Metal powders assist in heat dissipation during any tool working steps.

On its side opposite to the support member 2, the abrasive block 3 has a working surface 3a, which is substantially planar and preferably has a wide radiused portion 3a close to and extending along two non-adjacent corners, usually those that, in use, will be placed transversally to the moving (working) direction of the block tool for carrying out optimal smoothing and polishing operations of planar materials, e.g. stony materials.

Preferably, the support member 2 is obtained by molding a suitable moldable material, e.g. a polyamide commercially available under the trademark Nylon® 6/6.6. The configuration of the support member can be any, e.g. a substantially tetrahedral, parallelepiped, cylindrical, cylindrical sector configuration, and the like.

Suitable materials for the matrix of the block tool 3 are preferably selected among: olefin polymers, styrene, vinyl chloride, or vinyl acetate copolymers, polyvinyl ether, polyacrylate resins, linear polyamides, mixed polyamides, and polyamine products, polyamides (PA), polymethacrylamide, polyamide-imide, polyether-imide, thermoplastic polyurethane polymers, amorphous polyamides, polybutylene-1, polymethylpentene, styrene polymers, vinyl chloride polymers (e.g. PVC), fluorinated polymers, poly(meta)acrylic plastics, molding PMMA (polymethylmethacrylate) masses, polycarbonate, polyalkylene terephthalates (PTP), polyarylates, oxides-sulfides (PPS)-linear sulphuric polyacrylics, mod. (PPO) polyphenyleneoxide, polyarylether (ketone, PEEK polysulfones).

Preferably, the abrasive material comprises granules of at least one component selected from the group comprising industrial diamond, tungsten carbide, silicon carbide, dark red corundum, boron nitride, boron carbide.

The matrix suitable for solubilizing or emulsifying the abrasive material is preferably comprises a thermoplastic resin, e.g. polyamide (nylon) 6/6.6, or a mixture of thermoplastic resins, and polystyrene.

A method of producing a block tool for working planar stony surfaces according to the present invention comprises first arranging the support member 2 in a mold, then loading the mold with the support member housed therein with a solution or emulsion of one or more granular abrasive materials, possibly of one or more filling materials or fillers, e.g. in the form of fibers or the like, in one or more thermoplastic materials designed to form, after polymerisation, a cohesion matrix for the abrasive material. Preferably, the solution or emulsion is injection loaded into the mold.

After having been loaded, the solution or emulsion undergoes polymerisation and thus setting of the mixture. Polymerisation of the thermoplastic material or materials can occur in any suitable way, as it is apparent to a person skilled in the art, e.g. in a spontaneous way or by using polymerisation catalyst agents.

When polymerisation or curing of the resin matrix has taken place, a block is obtained that is now integral with its respective support member 2 thereby forming a finished block tool 1. Of course, after setting, the finished block 1 is removed or extracted from the mold ready to be used.

Moreover, a block tool according to the present invention can be obtained by arranging a support member in a mold, loading in a controlled way the mold with the support member in it with powdered or granular abrasive material separately from a suitable thermoplastic resin or resins in the fluid state or by mixing together abrasive material and resin or resins immediately before loading them into the mold thereby minimizing the wearing action due to the abrasive material in forced-feeding ducts for the resin or resins. Resin feeding parameters, resin flow rate, type of nozzles and dosage of abrasive material must be such as to guarantee uniform distribution of the abrasive in the resin. Also in the case of abrasive material and resins being loaded separately or in an almost separate way, the block tool is completed when setting of the resin is terminated.

Figure 6:
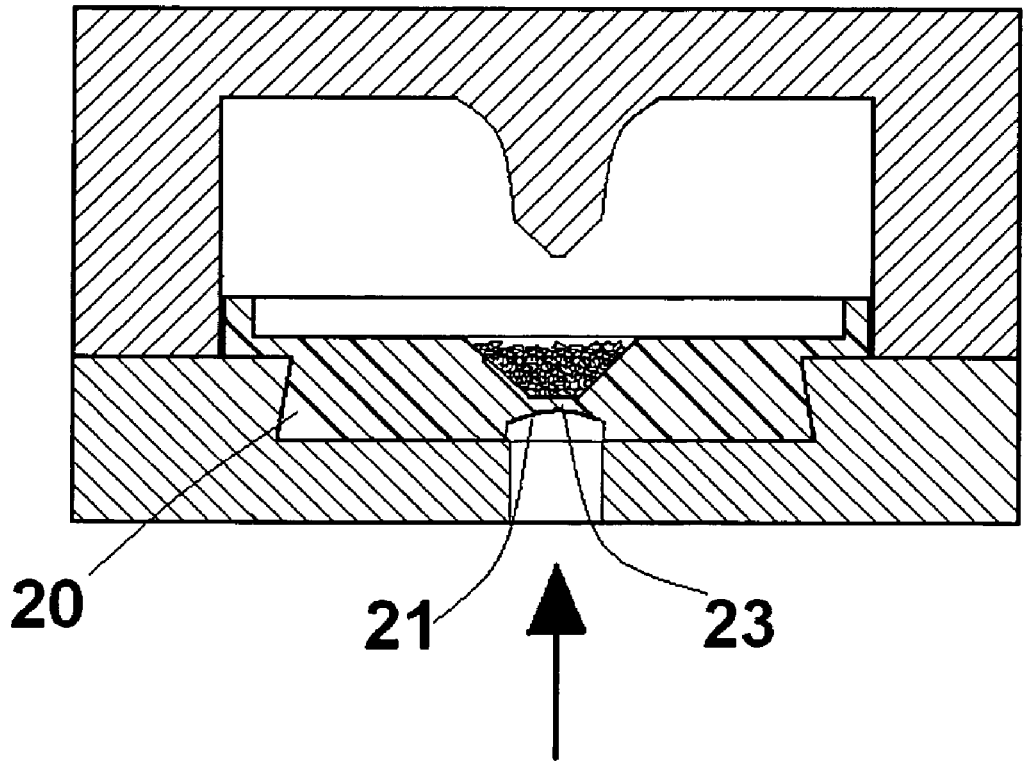
FIG. 6 is a cross-sectional view of a mold provided with the support member of FIG. 5.

With reference to FIGS. 5 and 6, a support member 20 is illustrated, in which a channel 21 has been formed in the coupling side thereof for being secured to a machine tool, whereas a seat 22 has been formed in its abrasive portion. Channel 21 and seat 22 are separated by a wall, preferably a very thin wall, or diaphragm 23, from one another.

In order to obtain an abrasive tool according to the present invention, support member 20 is arranged in a mold cavity in such a way that the channel 21 is in fluid communication with the injection channel of the mold. A suitable abrasive material or mixtures of abrasive materials are then loaded into the seat 22. At this point, a thermoplastic resin or mixture of resins is injected thereinto, preferably at a temperature ranging from about 250° C. to 400° C. At such a temperature, the diaphragm 23 is dissolves or broken and the resin mixture is thus injected into the mold cavity whereby dispersing the abrasive material or materials therein. Preferably, in order to obtain a rapid dissolution or breakage of the diaphragm 23 in contact with the resin or resins, the support member is made of a material having a melting point ranging from about 230° C. to about 260° C.

In order to guarantee a good uniformity of abrasive materials in the thermoplastic resins, one or more projections, preferably located at the seat 22, can be provided in the mold cavity, which are designed to generate mixing vortexes in the solution comprising resin or resins and abrasive materials.

To obtain an abrasive block or a block tool provided with a support member with no channel 21 and seat 22, the abrasive material can also be arranged along a feeding path of the resins to the mold. In such a case, the entrainment of the abrasive is carried away by the resin mixture along such path and transferred to the mold, and thus uniform distribution of the abrasive in the mixture is ensured.

Both methods described above make it possible to obtain a block tool of set material (matrix) in which the abrasive material is dispersed in the resin in an almost uniform way, in one method uniformity being ensured by the abrasive being entrained by the resin, whereas in the other due to the characteristic features, on one hand, of the resin feeding system, and of the abrasive material, on the other.

According to another method of manufacturing a block tool according to a preferred embodiment of the present invention, an abrasive block is obtained by molding, preferably by injection molding, a solution or emulsion as defined above, and, after the molded block has been withdrawn from the mold, by fixing it to a suitable separately made support member 2 through suitable retaining means, e.g. gluing or use of known retaining means, commercially available under the trade name "Velcro"®.

Such method makes it possible then to obtain an abrasive block tool only after a block has been secured to a support member. The support member can be secured to the abrasive block either before or after extraction from the mold, e.g. by securing it to the support member even while the solid block is still located in the mold cavity.

In all three described methods, however, an abrasive block can be manufactured either by feeding a solution or emulsion of at least one granular abrasive material dispersed in a resin matrix comprising at least one thermoplastic resin or by separately feeding the resinous matrix and the granules of abrasive material. In the latter case, to obtain a uniform dispersion of the abrasive material in the matrix, one can proceed by applying first a resin matrix layer into the mold cavity and then a quantity of abrasive material, and then again a resin matrix layer, and so on until the whole mold cavity is filled. Alternatively, after the matrix and abrasive material have been loaded into a mold cavity, one can proceed to disperse the abrasive material in the matrix by using a suitable mixing system.

The first method according to the present invention is illustrated in more detail in the following description by some preferred embodiment thereof.

Example 1

A block tool according to the present invention was prepared, which had a support member made of nylon filled with 20% of glass fibers, onto which a solution of thermoplastic resin commercially available under the tradename Nevamide 209 G 30 produced by the company Nevicolor S.p.A. at Luzzara (Reggio Emilia—Italy) was injection loaded into a suitable mold with the addition of granules of 80/100 mesh industrial diamond in a percentage of 7% with respect to resin.

The resin was allowed spontaneously to solidify in the mold for 180 seconds, the mold was then open and a finished block tool was extracted which was provided with an attachment head similar to that of conventional blocks with a very good distribution of the abrasive material in the resin (matrix).

Example 2

A block tool according to the present invention was prepared, which had a support member made of nylon filled with 20% glass fibers, onto which a solution of thermoplastic resin commercially available under the tradename Krasten (thermoplastic polyester) and produced by the company Nevicolor S.p.A. at Luzzara (Reggio Emilia—Italy) was injected. The abrasive material comprising granules of 80/100 mesh industrial diamond was mixed with the thermoplastic resin at 7:93 ratio and the mixture was injection loaded into a mold having a plurality of cavities. Solidification took place in 180 seconds. Once solidification was terminated, six block tools was removed from the mold, which were ready for use and had a very good distribution of the abrasive granules in the matrix.

Example 3

A block tool according to the present invention was prepared, which had a support made of nylon with 20% glass fibers, onto which a solution comprising a thermoplastic acetal resin with 5% (60 g) silicon carbide, 2% 75-150 microns tungsten carbide, and 3% 80/100 mesh industrial diamond dispersed therein was injection loaded in a mold.

After solidification of the resin, a block tool was obtained ready to be used and with a very good distribution of abrasive material in it.

Preferably block tools according to the present invention have a support member made of nylon with 10-30% glass fibers dispersed therein.

The above-described tests were repeated in a similar way in view of preparing abrasive blocks with no support member for attachment to a tool machine. Such blocks can be secured to a respective supporting member either before or after removal from the mold by means of suitable retaining means, e.g. a suitable gluing means or a Velcro system.

Trials or tests on four tiles 30×30 cm in size comprising the following materials: Carrara marble, Africa black granite, resin-quartz agglomerate (artificial stone), gres, were carried out.

Tests were aimed at establishing the degree of removal of the tools manufactured according to the present invention as measured by the loss of weight of the tiles after working. To carry out such tests, a single-head polishing machine having a 135 mm tool head with a feed rate of 400 mm/min was used and provided with block tools according to the present invention designed as oscillating sectors (blocks), as is conventional in granite smoothing operations. The peripheral speed of rotation of the tool head was about 12 m/sec while a cooling liquid (water) was fed at a rate of 20 liters/min. The working pressure was at about 2.0 bar. Four runs were carried out for each test.

As a reference tool, an Evolution Tenax pos. 7 tool, and a 120 S type of a "resinoid fingrain" binder tool were used.

Test results are shown in the following Table.

|  | Tenax pos 7 | Example 1 | Example 2 | Example 3 | Fingrain 120S |
|---|---|---|---|---|---|
| Carrara marble Weight loss (g) Appearance | 10.2 Breakages at corners, bleached | 8 Unchanged with color tone | 9.1 Unchanged with color tone and removal grooves | 6 Unchanged with high color tone | 8.1 Unchanged with color tone of Example 3 |
| black Africa granite Weight loss (g) Appearance | 3.2 Slightly breached at the edges, bleached | 2.2 Unchanged with much color tone | 2.9 With color tone and removal grooves | 1.6 Unchanged with little color tone | 2.7 Unchanged with poor color tone |
| Resin-quartz agglomerate Weight loss (g) Appearance | 2.7 Unchanged, bleached | 1.2 Unchanged with good color tone | 1.7 Unchanged with color tone and apparent defect grooves | 1.1 Unchanged with sufficient color tone | 1.9 Unchanged with fairly good color tone |
| Gres Ceramics Weight loss (g) Appearance | 1.5 breached, bleached and grooved | 0.5 Unchanged with no signs | 0.7 Unchanged with defect line deeply | 0.2 Unchanged with no defect grooves | 0.7 Unchanged with no defect grooves |

Tests have shown that the block tools according to the present invention are suitable for improving the background color of the worked material, and thus for carrying out polishing operations having higher tone and depth effects than the presently available polishing systems. The thermoplastic resin used has a good removal power and no corner breakages and/or tool breaks independently of the material to be worked.

Detected electric power consumptions were such as to make the tool very competitive with respect the block tools presently available in the market. Production costs of the block tools according to the present invention are approximately half those of diamond block tools including a binder consisting of a thermosetting resin, and 10 times lower than those of tools comprising a sintered metal binder. The specific manufacturing process makes also possible to provide cooling channels 4 in the molding step (FIGS. 1 and 4) to assist in keeping the mechanical characteristics of the block tool unchanged during the working step.

The system as described above is susceptible to numerous modifications and changes within the scope as defined by the claims.

Thus, for example, the structure and shape of the abrasive portion according to the present invention can be various: sector-like, parallelepiped, cylindrical, etc., depending on the applications, as it is known in the art of polishing plane surfaces and a rib portions by making use of a numerical control machine tool.

The invention claimed is:

1. A method of producing a block tool, provided with a support member, comprising the following steps in sequence:
    arranging at least one support member in a mold, said support member comprising a wall or diaphragm having at least one portion reduced in thickness;
    loading the mold with at least one granular abrasive material on said wall or diaphragm;
    injection feeding at least one thermoplastic resin onto said wall or diaphragm and on the opposite side with respect to said at least one abrasive material;
    causing said wall to become dissolved or broken, thereby allowing said at least one abrasive material to become dispersed in said at least one thermoplastic resin.

2. The method as claimed in claim 1, wherein said at least one thermoplastic resin is supplied at a temperature of about 250-400° C.

3. The method as claimed in claim 1, wherein said support member is mace of a material having a melting point of about 230-260° C.

4. The method as claimed in claim 1, wherein said support comprises a seat formed for receiving said abrasive material, and at least one channel, said at least one channel and said seat being separated from one another by said at least one portion reduced in thickness of said wall or diaphragm.

5. The method as claimed in claim 1, wherein at least one projection designed to generate mixing vortexes in said injected resin is provided in said mold cavity.

6. The method as claimed in claim 5, wherein said support comprises a seat formed for receiving said abrasive material, and said at least one projection is located at said seat.

* * * * *